United States Patent
Tung (10) Patent No.: US 9,444,395 B2
(45) Date of Patent: Sep. 13, 2016

(54) SUPPORT ASSEMBLY FOR MOUNTING A SOLAR PANEL UNIT

(71) Applicant: SUN RISE E & T CORPORATION, Pingtung, Pingtung County (TW)

(72) Inventor: Chi-Hsu Tung, Pingtung (TW)

(73) Assignee: SUN RISE E & T CORPORATION, Pingtung, Pingtung County (TW)

( * ) Notice: Subject to any disclaimer, the term of this patent is extended or adjusted under 35 U.S.C. 154(b) by 0 days.

(21) Appl. No.: 14/504,129

(22) Filed: Oct. 1, 2014

(65) Prior Publication Data

US 2015/0214883 A1    Jul. 30, 2015

(30) Foreign Application Priority Data

Jan. 28, 2014  (TW) ................ 103201841 U (51) Int. Cl.
*A47G 19/08*  (2006.01)
*H02S 20/10*  (2014.01)
*F24J 2/52*  (2006.01)

(52) U.S. Cl.
CPC .............. *H02S 20/10* (2014.12); *F24J 2/525* (2013.01); *F24J 2/526* (2013.01); *F24J 2/5233* (2013.01); *F24J 2002/5216* (2013.01); *F24J 2002/5292* (2013.01); *Y02E 10/47* (2013.01)

(58) Field of Classification Search
CPC ... A47B 45/00; A47B 47/0008; H02S 20/10; F24J 2/525; F24J 2/526; F24J 2/5233; F24J 2002/5216; F24J 2002/5292; Y02E 10/47

USPC ....... 211/41.1, 182; 52/173.3; 136/243, 245, 136/246, 248; 126/438
See application file for complete search history.

(56) References Cited

U.S. PATENT DOCUMENTS

| | | | |
|---|---|---|---|
| 4,226,256 A * | 10/1980 | Hawley .................... | 136/244 |
| 4,269,173 A * | 5/1981 | Krueger et al. ............. | 126/634 |
| 4,374,406 A * | 2/1983 | Hepp ......................... | 362/253 |
| 4,421,943 A * | 12/1983 | Withjack ................... | 136/246 |
| 4,999,059 A * | 3/1991 | Bagno ...................... | 136/248 |
| 5,125,608 A * | 6/1992 | McMaster et al. ........ | 248/163.1 |
| 5,244,508 A * | 9/1993 | Colozza .................... | 136/245 |
| 6,201,181 B1 * | 3/2001 | Azzam et al. ............. | 136/244 |
| 6,629,389 B1 * | 10/2003 | Rust ......................... | 52/157 |
| 7,481,211 B2 * | 1/2009 | Klein ........................ | 126/621 |
| 8,713,881 B2 * | 5/2014 | DuPont et al. ............ | 52/489.2 |
| 9,046,282 B2 * | 6/2015 | Belikoff et al. | |
| 2002/0124447 A1* | 9/2002 | Burke ........................ | 40/606 |
| 2010/0089390 A1* | 4/2010 | Miros et al. ............... | 126/608 |
| 2010/0269888 A1* | 10/2010 | Johnston, Jr. ............. | 136/251 |
| 2010/0299891 A1* | 12/2010 | Myers ...................... | 24/457 |
| 2011/0024582 A1* | 2/2011 | Gies et al. ................ | 248/122.1 |

(Continued)

*Primary Examiner* — Basil Katcheves
(74) *Attorney, Agent, or Firm* — Muncy, Geissler, Olds & Lowe, P.C.

(57) ABSTRACT

A support assembly for mounting a solar panel unit includes a base unit and a supporting unit. The base unit includes a plurality of base tubes that are spaced apart from one another and two connecting tubes that are respectively and detachably connected to opposite end portions of each of the base tubes. The supporting unit includes a plurality of limiting components and a plurality of supporting rods. Each limiting component permits at least two of the base tubes to extend therethrough so as to position the at least two of the base tubes relative to each other. Each supporting rod is detachably connected to and extends upwardly from a corresponding one of the limiting components and is adapted for supporting the solar panel unit thereon.

4 Claims, 10 Drawing Sheets

(56) References Cited

U.S. PATENT DOCUMENTS

2011/0088740 A1* 4/2011 Mittan et al. ............. 136/244
2011/0176256 A1* 7/2011 Van Straten ............. 361/601
2011/0233157 A1* 9/2011 Kmita ..................... 211/41.1
2012/0145228 A1* 6/2012 Miros et al. .............. 136/251
2012/0180406 A1* 7/2012 Kobayashi ................ 52/173.3

* cited by examiner

SUPPORT ASSEMBLY FOR MOUNTING A SOLAR PANEL UNIT

CROSS-REFERENCE TO RELATED APPLICATION

This application claims priority of Taiwanese Patent Application No. 103201841, filed on Jan. 28, 2014, the entire disclosure of which is hereby incorporated by reference.

FIELD OF THE INVENTION

This invention relates to a support assembly, more particularly to a support assembly for mounting a solar panel unit.

BACKGROUND OF THE INVENTION

Figure 1:
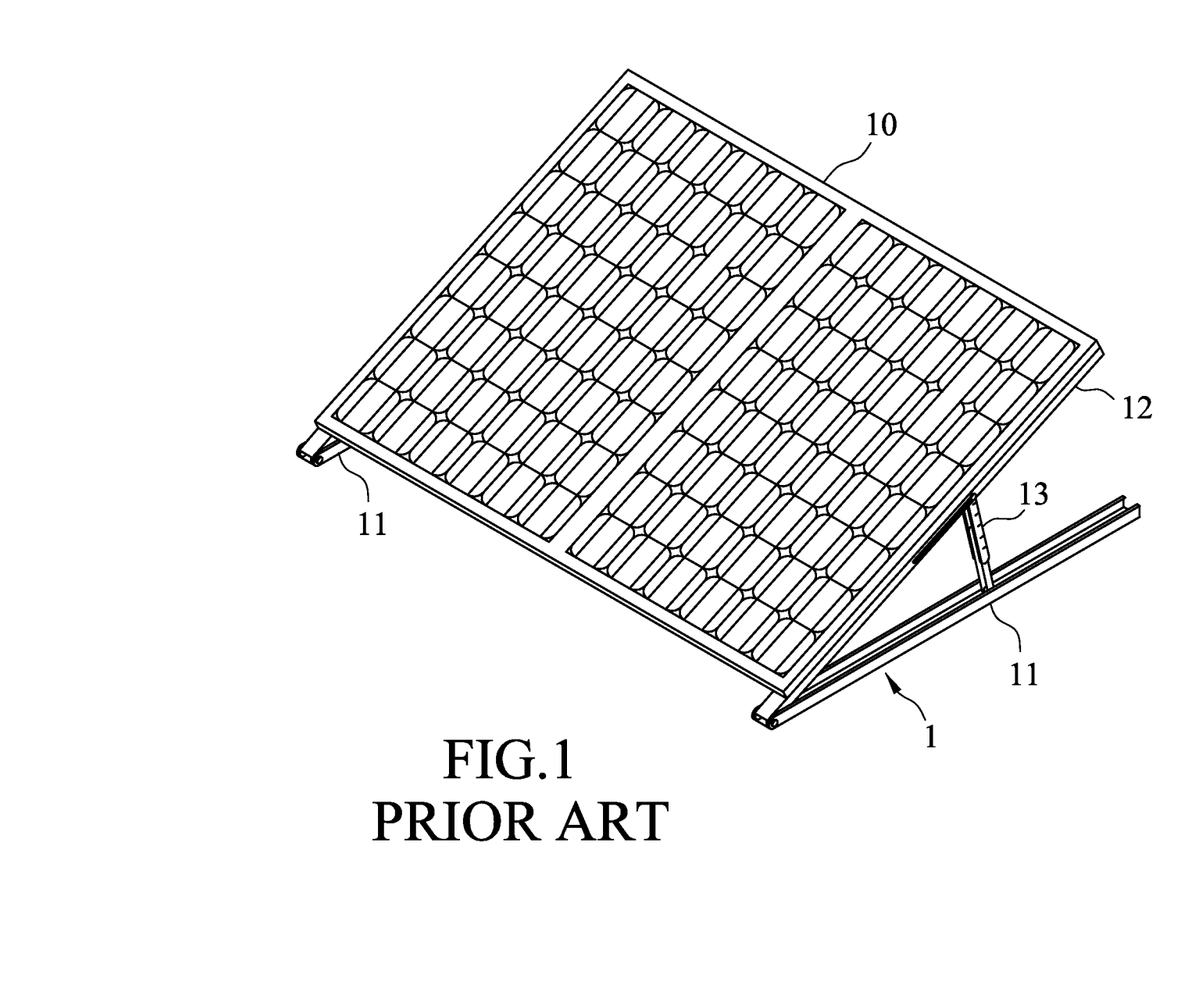
FIG. 1 is a perspective view of a conventional support assembly for mounting a solar panel unit illustrated in Taiwanese Utility Model Patent No. M408023.

Referring to FIG. 1, Taiwanese Utility Model Patent No. M408023 discloses a conventional support assembly 1 for mounting a solar panel unit 10. The conventional support assembly 1 includes a supporting frame 12, two supporting brackets 11 that are connected to the supporting frame 12, and two supporting rods 13 (only one is shown in FIG. 1 due to the view angle) each interconnecting the corresponding supporting bracket 11 and the supporting frame 12 such that the supporting frame 12 is inclined. The supporting frame 12 is configured for mounting the solar panel unit 10. The supporting brackets 11 are adapted to be mounted on a ground (not shown). However, since the contact area between the supporting brackets 11 and the ground is relatively small, the solar panel unit 10 cannot be firmly mounted on the ground if the ground surface is not flat. Therefore, a flat cement ground has to be built in advance. Since the support assembly 1 has to be transported along with the cement, the transporting cost is relatively high. Moreover, when the support assembly 1 has to be removed, the cement ground also has to be torn down. To tear down the cement ground results in waste of time and cost.

SUMMARY OF THE INVENTION

Therefore, the object of the present invention is to provide a support assembly that can overcome at least one of the aforesaid drawbacks of the prior art.

According to this invention, a support assembly for mounting a solar panel unit includes a base unit and a supporting unit. The base unit includes a plurality of base tubes that are spaced apart from one another and two connecting tubes that are respectively and detachably connected to opposite end portions of each of the base tubes. The supporting unit includes a plurality of limiting components and a plurality of supporting rods. Each limiting component permits at least two of the base tubes to extend therethrough so as to position the at least two of the base tubes relative to each other. Each supporting rod is detachably connected to and extends upwardly from a corresponding one of the limiting components and is adapted for supporting the solar panel unit thereon.

BRIEF DESCRIPTION OF THE DRAWINGS

Other features and advantages of the present invention will become apparent in the following detailed description of the embodiments of this invention, with reference to the accompanying drawings, in which.

DETAILED DESCRIPTION OF THE EMBODIMENTS

Before the present invention is described in greater detail, it should be noted that like elements are denoted by the same reference numerals throughout the disclosure.

Figure 2:
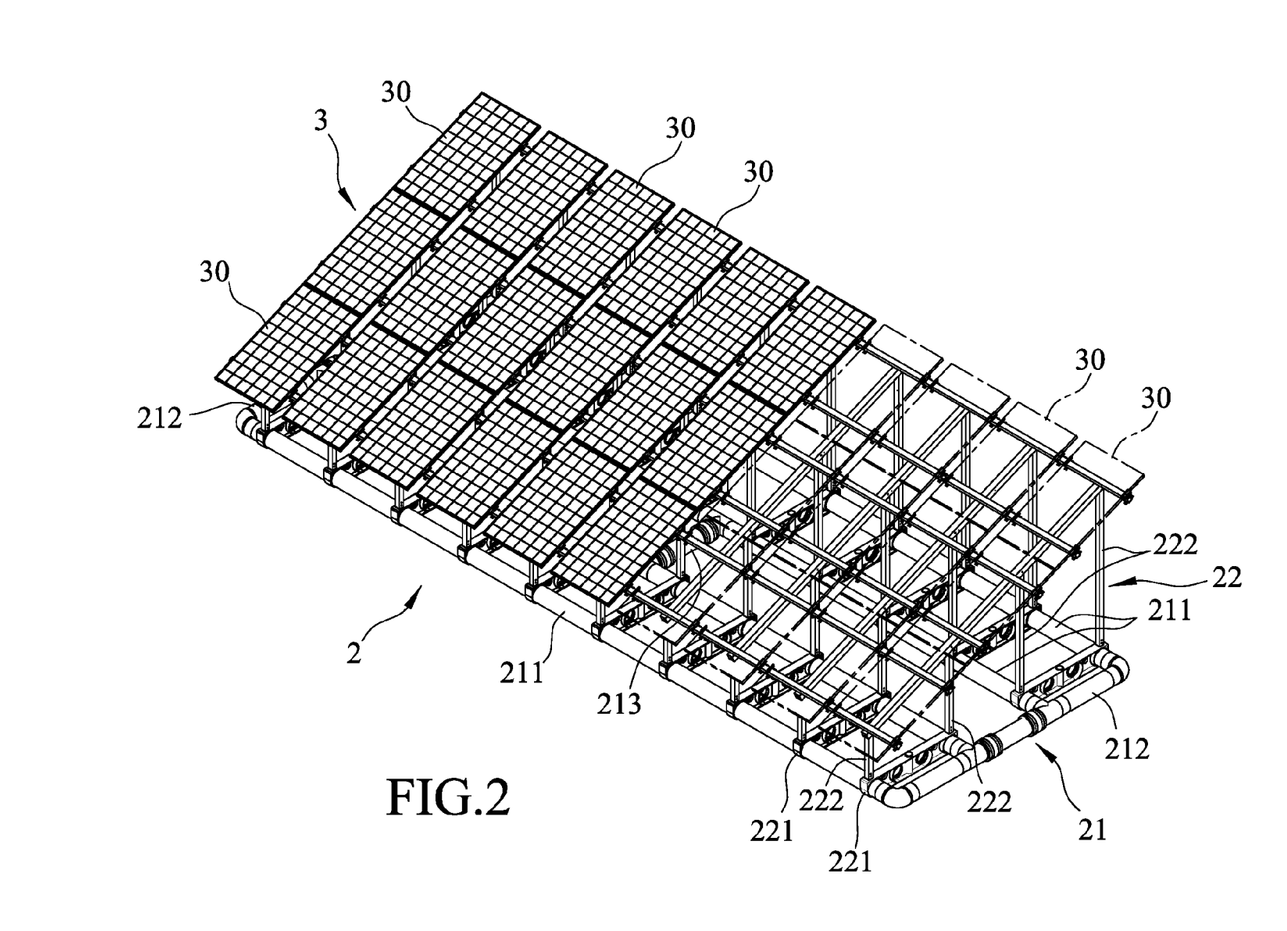
FIG. 2 is a perspective view of the first embodiment of a support assembly for mounting a solar panel unit according to this invention.

Referring to FIG. 2, the first embodiment of a support assembly 2 for mounting a solar panel unit 3 on a ground 4 (see FIG. 10) according to the present invention is shown to include a base unit 21 and a supporting unit 22.

Figure 3:
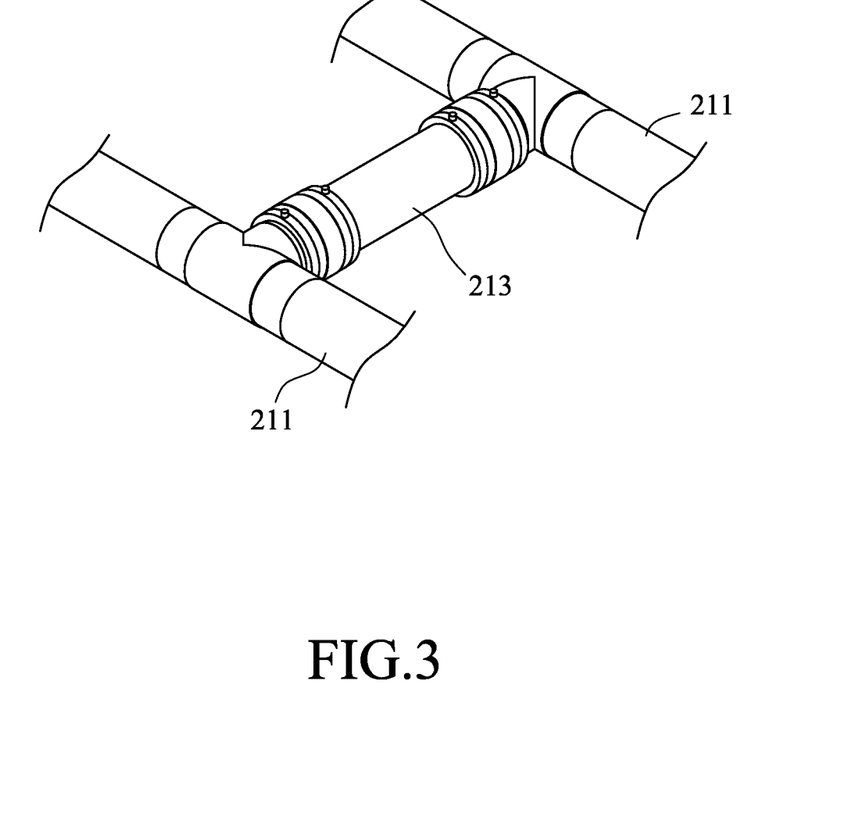
FIG. 3 is a fragmentary perspective view of the first embodiment, showing connection between two base tubes and a reinforcing tube.
Figure 4:
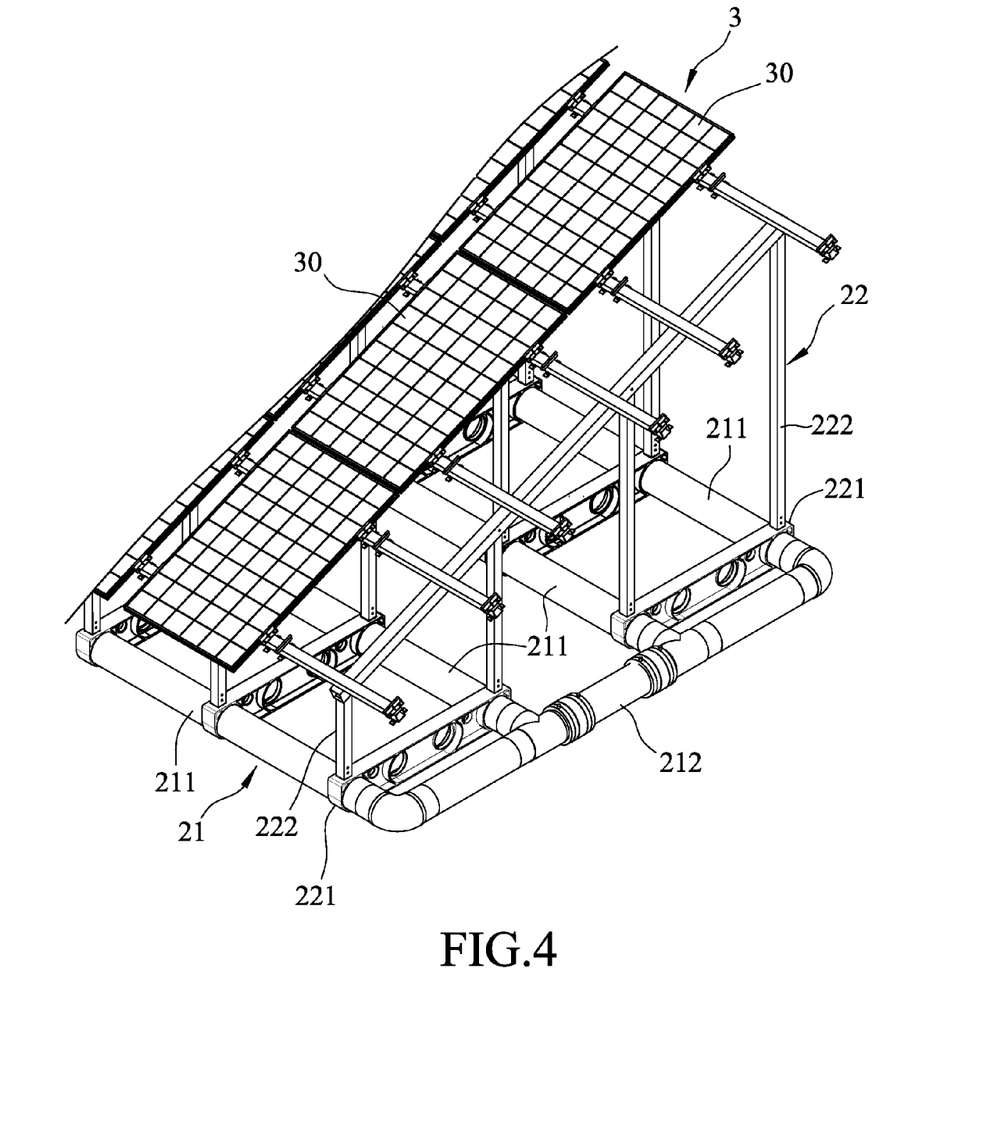
FIG. 4 is a fragmentary perspective view of the first embodiment, showing a base unit and a supporting unit.

Referring to FIGS. 2 to 4, the base unit 21 includes a plurality of base tubes 211 that are spaced apart from one another, two connecting tubes 212 that are respectively and detachably connected to opposite end portions of each of the base tubes 211, and a reinforcing tube 213 that interconnects two of the base tubes 211 for reinforcing a structural strength of the base unit 21. In this embodiment, the base tubes 211 and the connecting tubes 212 are arranged in an array so as to increase the contact area between the base unit 21 and the ground 4, so that the base unit 21 can be firmly mounted on the ground 4 by virtue of its own weight. It is worth noting that when the lengths of the base tubes 211 are relatively longer, the number of the connecting reinforcing tube 213 can be increased (i.e., the number of the reinforcing tube 213 may be two, three, or more) for further reinforcing the structural strength of the base unit 21 to meet actual requirements.

Figure 5:
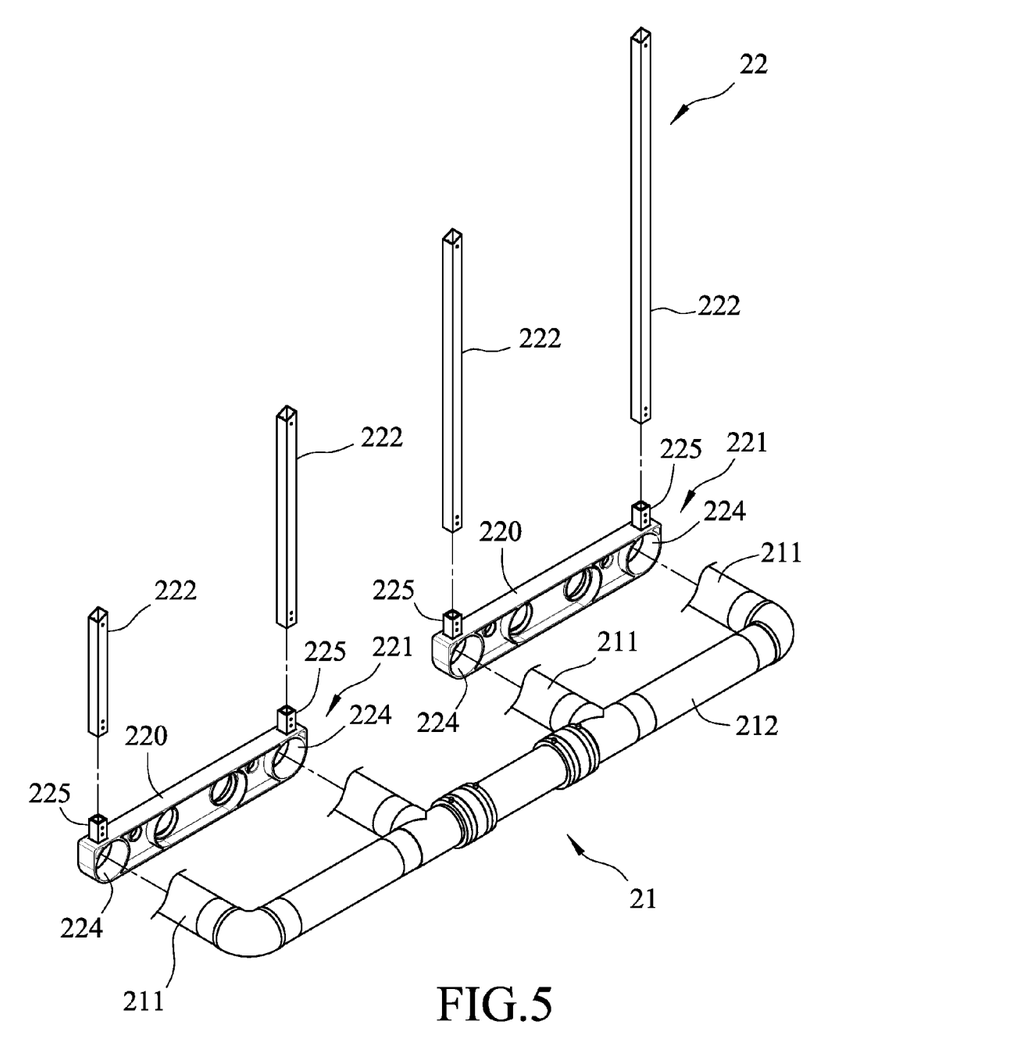
FIG. 5 is a fragmentary exploded perspective view of the first embodiment, showing connection between the base unit and the supporting unit.
Figure 6:
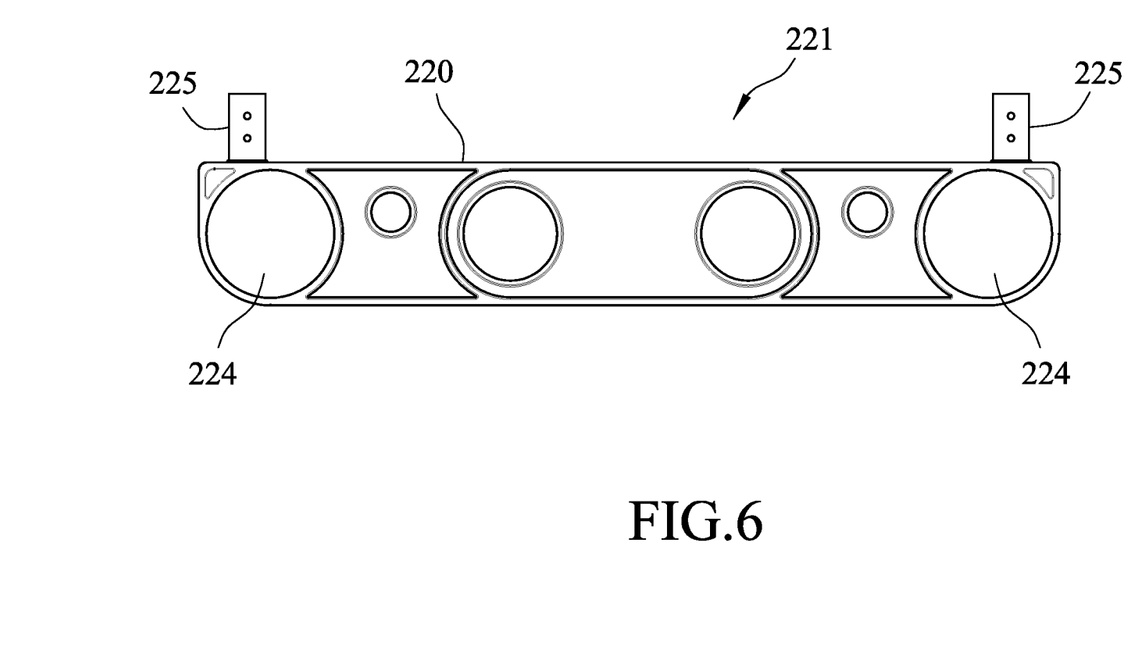
FIG. 6 is a side view of a limiting component of the supporting unit of the first embodiment.
Figure 7:
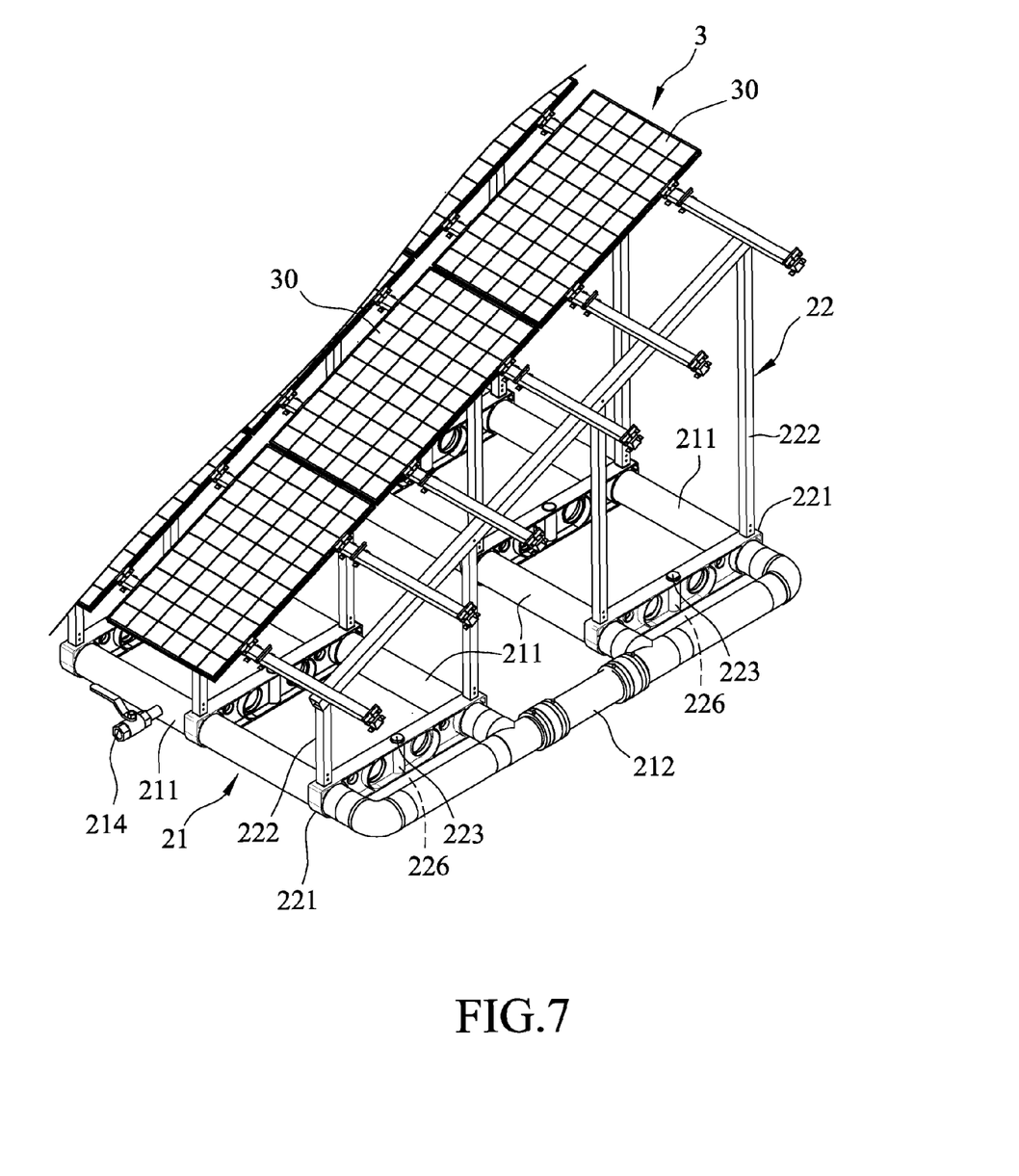
FIG. 7 is a fragmentary enlarged perspective view of the second embodiment of a support assembly according to this invention.
Figure 8:
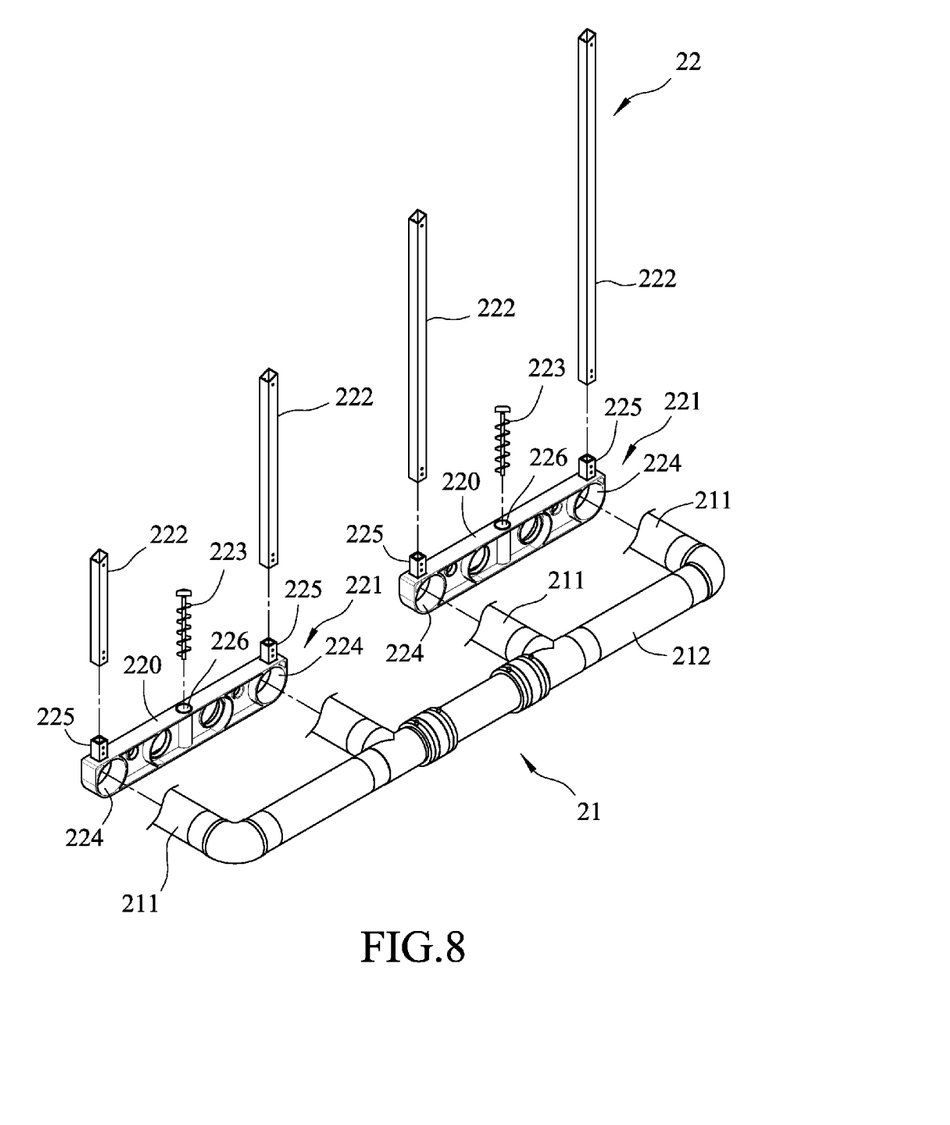
FIG. 8 is a fragmentary exploded perspective view of the second embodiment, showing connection between a base unit and a supporting unit.
Figure 9:
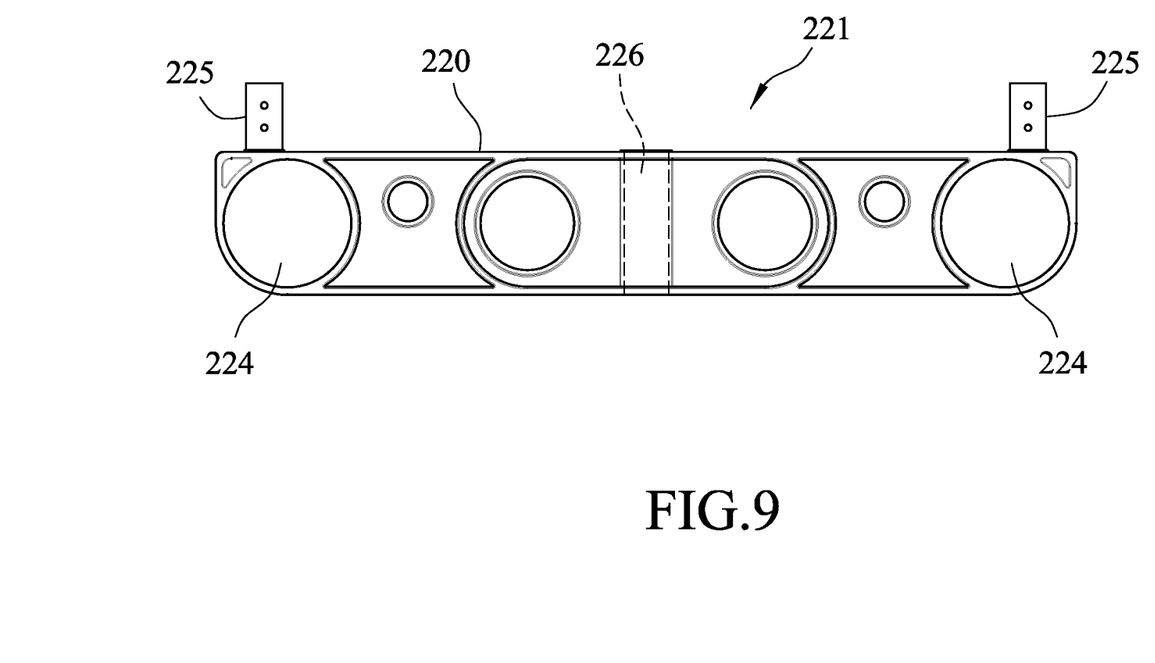
FIG. 9 is a side view of a limiting component of the supporting unit of the second embodiment.

Referring to FIGS. 4 to 6, the supporting unit 22 includes a plurality of limiting components 221 and a plurality of supporting rods 222.

Each limiting component 221 permits two the base tubes 211 to extend therethrough so as to position the two of the base tubes 211 relative to each other. Each supporting rod 222 is detachably connected to and extends upwardly from a corresponding one of the limiting components 221, and is adapted for supporting the solar panel unit 3 thereon. As such, the supporting rods 222 are arranged in a plurality of rows. The supporting rods 222 of each row are arranged along a direction parallel to the connecting tubes 212.

To be more specific, in this embodiment, each limiting component 221 has a main body portion 220 that is formed with two through holes 224 spaced apart from each other, and two extending portions 225 that are spaced apart from each other and that extend upwardly from the main body portion 220. Each through hole 224 is disposed for permitting a respective one of the base tubes 211 to extend therethrough. Each extending portion 225 is disposed for permitting a respective one of the supporting rods 222 to be sleeved fixedly thereon. It should be noted that, referring to FIG. 4, the supporting rods 222 of each row have different lengths such that the solar panel unit 3 can be mounted on the supporting rods 222 at an inclination angle. In this embodiment, the solar panel unit 3 includes a plurality of solar panels 30.

Referring back to FIG. 5, the assembling process of the first embodiment of the support assembly 2 includes the following steps of: extending each base tube 211 through the corresponding one of the through holes 224 of the main body portions 220; respectively connecting the connecting tubes 212 to the opposite end portions of each of the base tubes 211; sleeving each supporting rod 222 on the corresponding one of the extending portions 225 of the limiting components 221; and mounting the solar panel unit 3 on the supporting rods 222 (see FIG. 4). It should be noted that, in this embodiment, there is no need for building a cement ground in advance which is required for the above-mentioned prior art.

The disassembling process of the first embodiment of the support assembly 2 includes the following steps of: separating the solar panel unit 3 and the supporting rods 222; separating the supporting rods 222 and the extending portions 225 of the limiting components 221; separating the connecting tubes 212 and the base tubes 211; and separating the base tubes 211 from the through holes 224 of the main body portions 220. Since the support assembly 2 is simple to assemble/disassemble repeatedly, it is convenient for a user to transport the support assembly 2.

Referring to FIGS. 7 to 10, the second embodiment of a support assembly 2 for mounting a solar panel unit 3 according to the present invention has a structure similar to that of the first embodiment, except that the main body portion 220 of each of the limiting components 221 is further formed with a aperture 226, the supporting unit 22 further includes a plurality of positioning components 223, and the base unit 21 further includes a charging valve 214.

Figure 10:
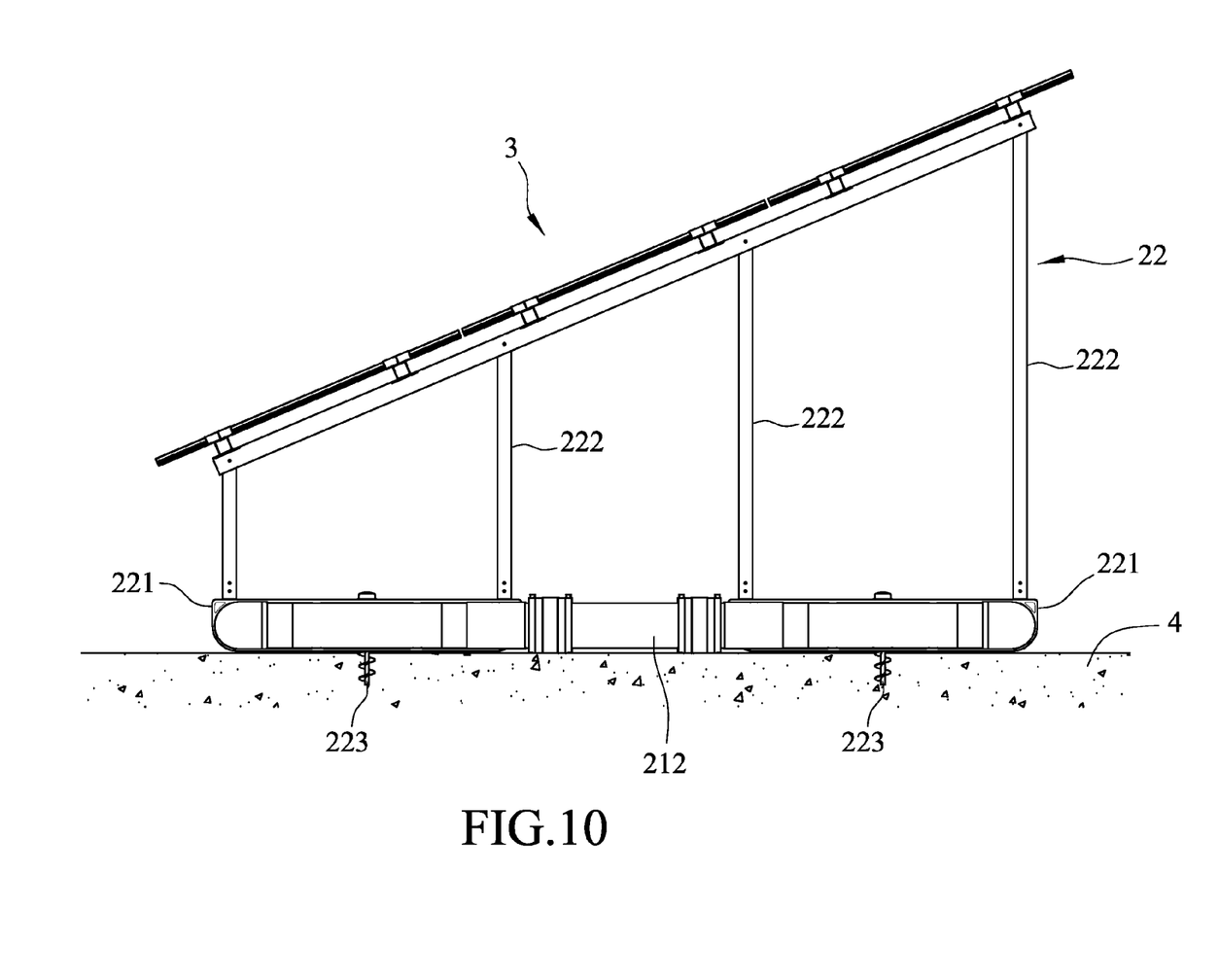
FIG. 10 is a side view, showing the second embodiment of the support assembly being mounted on the ground.

To be more specific, in this embodiment, each positioning component 223 extends through the aperture 226 of the main body portion 220 of a respective one of the limiting components 221 and is adapted to extend into the ground 4 for mounting fixedly a corresponding one of the limiting components 221 on the ground 4 (see FIG. 10). Each positioning component 223 is, for example but not limited to, a spiral anchor. The base tubes 211 are in spatial communication with and connected sealingly to the connecting tubes 212. In this embodiment, the charging valve 214 is disposed on one of the base tubes 211 and is operable for forcing liquid from the outside into the base tubes 211 and the connecting tubes 212. It should be noted that, in a variation of this embodiment, the charging valve 214 may also be disposed on one of the connecting tubes 212.

The assembling process of the second embodiment of the support assembly 2 is similar to that of the first embodiment, except that it further includes a step of extending each positioning component 223 through the aperture 226 of the main body portion 220 of a respective one of the limiting components 221, and forcing the liquid from the outside into the base tubs 211 and the connecting tubes 212 through operation of the charging valve 214. The liquid is, for example but not limited to, water. Through operation of the positioning components 223 and the apertures 226, the limiting components 221 can be firmly and fixedly mounted on the ground 4. Moreover, the liquid that is pumped into the base tubes 211 and the connecting tubes 212 increases the weight of the whole structure so as to prevent the support assembly 2 from inclining.

The disassembling process of the second embodiment of the support assembly 2 is similar to that of the first embodiment, except that it further includes a step of separating the positioning components 223 form the ground 4 and the through holes 226. It should be noted that the liquid can be obtained at the place to assemble the support assembly 2. That is to say, there is no need to transport the liquid along with the support assembly 2, thereby reducing the total transported weight.

While the present invention has been described in connection with what are considered the most practical embodiments, it is understood that this invention is not limited to the disclosed embodiments but is intended to cover various arrangements included within the spirit and scope of the broadest interpretation and equivalent arrangements.

What is claimed is:

1. A support assembly for mounting a solar panel unit, comprising:

a base unit including a plurality of base tubes that are spaced apart from one another, and two connecting tubes that are respectively and detachably connected to opposite end portions of each of said base tubes; and a supporting unit including a plurality of limiting components each permitting at least two of said base tubes to extend therethrough so as to position said at least two of said base tubes relative to each other, and a plurality of supporting rods each detachably connected to and extending upwardly from a corresponding one of said limiting components and adapted for supporting the solar panel unit thereon, wherein each of said limiting components has a main body portion that is formed with two through holes spaced a art from each other, and two extending portions that are spaced apart from each other and that extend upwardly from said main body portion, each of said through holes being disposed for permitting a respective one of said base tubes to extend therethrough, each of said extending portions being disposed for permitting a respective one of said supporting rods to be sleeved fixedly thereon;

wherein, the support assembly is adapted to be mounted on a ground said main body portion of each of said limiting components being further formed with an aperture, said supporting unit further including a plurality of positioning components, each of said positioning components extending through said aperture of said main body portion of a respective one of said limiting components and adapted to extend into the ground for mounting fixedly a corresponding one of said limiting components on the ground; and wherein main body portion of each of said limiting components extends in a direction perpendicular to those of said base tubes.

2. The support assembly as claimed in claim 1, wherein each of said positioning components is a spiral anchor.

3. The support assembly as claimed in claim 1, wherein said base tubes are in spatial communication with and connected sealingly to said connecting tubes, said base unit further including a charging valve that is disposed on one of said base tubes and said connecting tubes and that is operable for forcing liquid from the outside into said base tubes and said connecting tubes.

4. The support assembly as claimed in claim 1, wherein said base unit further includes at least one reinforcing tube that interconnects two of said base tubes for reinforcing a structural strength of said base unit.

* * * * *